US011786849B2

(12) United States Patent
Trask et al.

(10) Patent No.: US 11,786,849 B2
(45) Date of Patent: Oct. 17, 2023

(54) SPRAYER FILTERING SYSTEM

(71) Applicant: AGCO Corporation, Duluth, GA (US)

(72) Inventors: Dean Lorenzo Trask, Spirit Lake, IA (US); Petrus Henricus Johannes Bouten, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 235 days.

(21) Appl. No.: 16/697,309

(22) Filed: Nov. 27, 2019

(65) Prior Publication Data
US 2021/0154604 A1 May 27, 2021

(51) Int. Cl.
| *B01D 35/02* | (2006.01) |
| *B01D 24/38* | (2006.01) |
| *B01F 27/113* | (2022.01) |
| *F02M 37/50* | (2019.01) |
| *B01D 24/00* | (2006.01) |

(52) U.S. Cl.
CPC ............ *B01D 35/02* (2013.01); *B01D 24/38* (2013.01); *B01F 27/113* (2022.01); *B01D 24/007* (2013.01); *F02M 37/50* (2019.01)

(58) Field of Classification Search
None
See application file for complete search history.

(56) References Cited

U.S. PATENT DOCUMENTS

| 2,246,866 | A | * | 6/1941 | Stribling | ............. | A01M 7/0042 |
| | | | | | | 239/168 |
| 3,166,020 | A | * | 1/1965 | Cook | .................... | B01F 25/312 |
| | | | | | | 417/198 |
| 3,463,397 | A | * | 8/1969 | Mecklin | .............. | A01M 7/0089 |
| | | | | | | 417/442 |
| 3,491,949 | A | * | 1/1970 | Hairston | .............. | A01C 23/003 |
| | | | | | | 238/9 |
| 3,826,474 | A | * | 7/1974 | Pareja | .................... | B01F 25/211 |
| | | | | | | 137/888 |
| 4,097,026 | A | * | 6/1978 | Haindl | .................... | B01F 25/53 |
| | | | | | | 366/101 |
| 4,114,195 | A | * | 9/1978 | Dirksing | ............. | B01F 25/3141 |
| | | | | | | 366/181.8 |
| 4,490,335 | A | * | 12/1984 | Marev | ................. | C08B 37/0003 |
| | | | | | | 426/429 |
| 4,602,742 | A | * | 7/1986 | Penson | ................. | A01M 7/006 |
| | | | | | | 239/587.5 |
| 4,638,924 | A | * | 1/1987 | Newsom | ............... | A01C 23/042 |
| | | | | | | 137/625.68 |
| 4,714,196 | A | * | 12/1987 | McEachern | ......... | A01M 7/0092 |
| | | | | | | 239/304 |
| 4,821,959 | A | * | 4/1989 | Browing | ............. | A01M 7/0042 |
| | | | | | | 56/16.8 |

(Continued)

*Primary Examiner* — Robert J Popovics

(57) ABSTRACT

A filtering apparatus is configured to receive pressurized fluid from a pump. The filtering apparatus has a main inlet, a main outlet, and a filtering branch comprising a first filter. An agitator of a tank from which the pump draws is configured to receive fluid flow from the filtering branch via a proportional valve and an inlet connection. A method of operating a filtering system includes influencing fluid flow from a tank to one or more nozzles via a filtering apparatus; and diverting a portion of the fluid flow through plural filters of a different mesh size back to an agitating mechanism through a lower portion of the tank.

8 Claims, 11 Drawing Sheets

(56) References Cited

U.S. PATENT DOCUMENTS

| | | | | |
|---|---|---|---|---|
| 4,826,083 A * | 5/1989 | Vanderjagt | B05B 9/06 | 239/168 |
| 4,844,346 A * | 7/1989 | Coffey | A01M 7/006 | 239/166 |
| 4,913,345 A * | 4/1990 | Setter | A01M 7/0042 | 239/304 |
| 4,949,656 A * | 8/1990 | Lyle | A01C 7/004 | 111/900 |
| 4,967,957 A * | 11/1990 | Bachman | B05B 9/06 | 239/62 |
| 4,970,973 A * | 11/1990 | Lyle | A01C 5/062 | 172/26 |
| 5,014,914 A * | 5/1991 | Wallen.ang.s | A01M 7/0089 | 239/405 |
| 5,016,817 A * | 5/1991 | Ghate | B01F 35/71745 | 239/113 |
| 5,190,218 A * | 3/1993 | Kayser | A01M 7/0042 | 239/142 |
| 5,260,875 A * | 11/1993 | Tofte | A01B 79/005 | 700/282 |
| 5,314,120 A * | 5/1994 | Nau | B05B 7/2486 | 239/155 |
| 5,584,996 A * | 12/1996 | Petit | B01J 8/1818 | 210/275 |
| 5,832,948 A * | 11/1998 | Schell | F04F 10/00 | 137/142 |
| 5,911,362 A * | 6/1999 | Wood | A01M 7/0089 | 239/161 |
| 5,918,808 A * | 7/1999 | Weddle | A01M 7/0092 | 239/159 |
| 6,019,116 A * | 2/2000 | Schell | B67D 7/0272 | 137/208 |
| 6,029,904 A * | 2/2000 | Taylor | A01C 23/042 | 239/127 |
| 6,079,633 A * | 6/2000 | Inoue | B41J 2/175 | 396/564 |
| 6,138,770 A * | 10/2000 | Kayser | A01B 59/06 | 280/460.1 |
| RE37,732 E * | 6/2002 | Newton | A01M 7/0092 | 137/538 |
| 6,749,131 B2 * | 6/2004 | Knight | A01M 7/0092 | 239/125 |
| 6,958,118 B2 * | 10/2005 | Hill | B01D 36/02 | 210/138 |
| 7,124,961 B2 * | 10/2006 | Wilting | B05B 9/0423 | 239/303 |
| 7,845,914 B2 * | 12/2010 | Engelbrecht | F04D 13/12 | 417/303 |
| 8,551,341 B2 * | 10/2013 | Conner | B01F 25/211 | 210/800 |
| 8,640,972 B2 * | 2/2014 | Otto | B08B 9/093 | 239/127 |
| 10,306,879 B2 * | 6/2019 | Proharam | A01M 7/0085 | |
| 10,499,562 B2 * | 12/2019 | Schwalbe | A01M 7/0085 | |
| 10,631,531 B2 * | 4/2020 | Engelbrecht | A01M 7/0089 | |
| 11,213,846 B1 * | 1/2022 | Sandey | B67D 7/362 | |
| 11,220,421 B1 * | 1/2022 | Sandey | B05B 1/205 | |
| 2012/0292402 A1 * | 11/2012 | Otto | B08B 9/093 | 239/142 |
| 2017/0006852 A1 * | 1/2017 | Engelbrecht | A01M 7/0053 | |
| 2021/0154604 A1 * | 5/2021 | Trask | B01D 35/02 | |

* cited by examiner

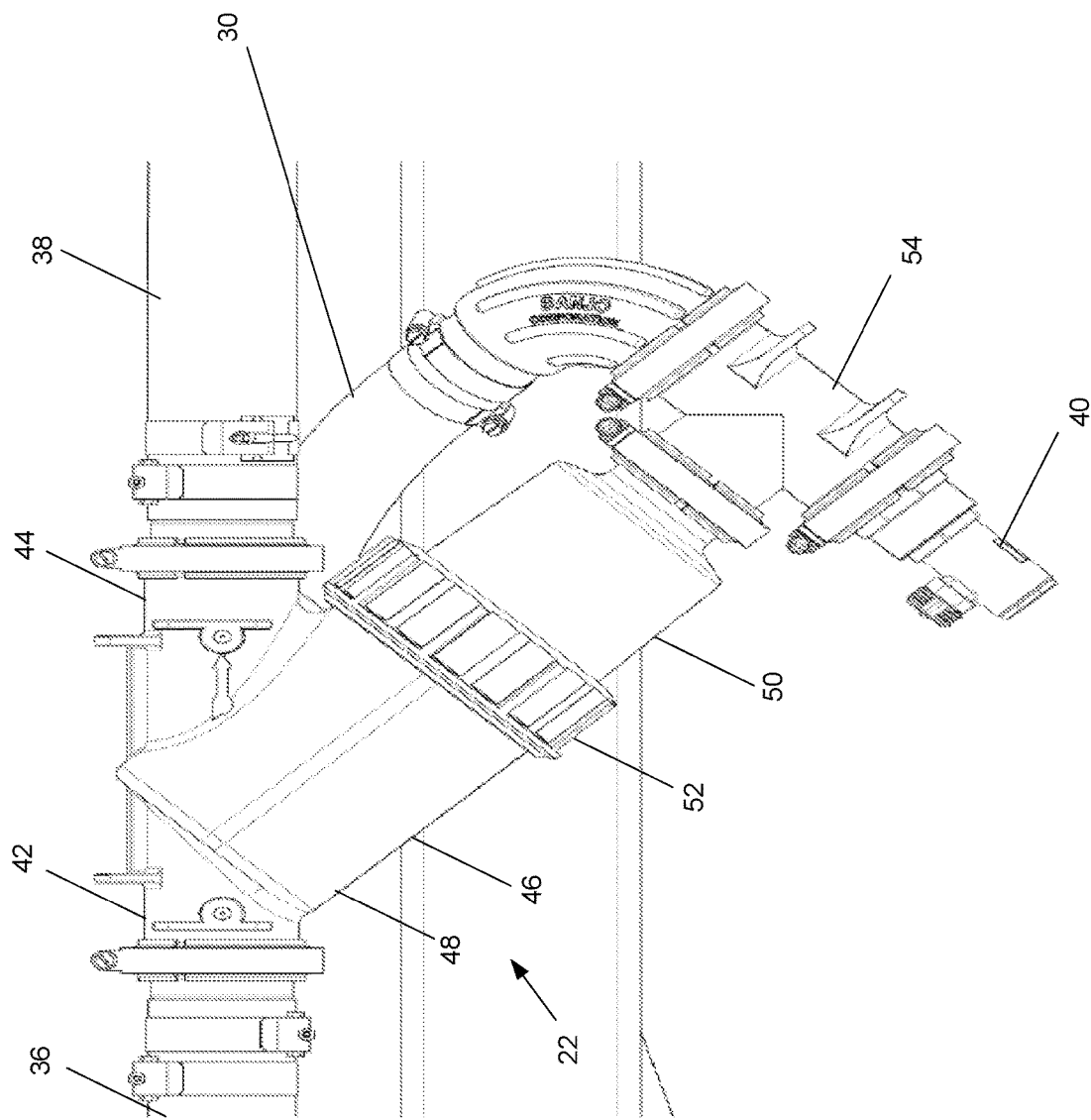

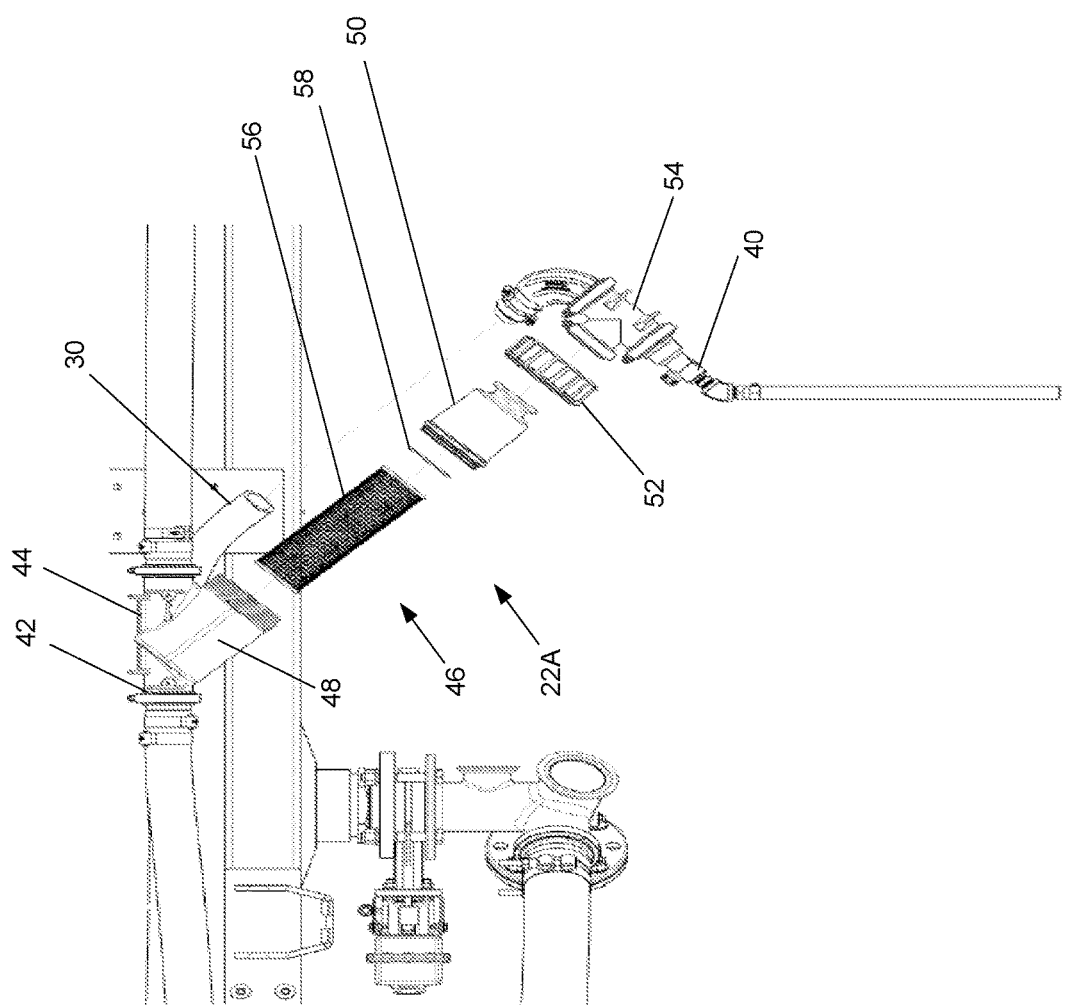

SPRAYER FILTERING SYSTEM

TECHNICAL FIELD

The present disclosure is generally related to sprayers, and in particular, filtering devices and systems for sprayers.

BACKGROUND

Filtration of a sprayer liquid system is important in preventing nozzle tip orifice openings from becoming clogged with particulates. Inadequate and absent application could result if an improper filter screen mesh size is utilized and/or solid residuals prevent the mixture from getting to the nozzles. For applicators that utilize suspension type products, proper agitation durations are required for attaining a homogeneous mixture before spraying commences. In the case where the suspension is not thoroughly agitated beforehand, potential clogging of the strainer screen will increase the cleaning interval, which causes more down time for the operator.

Current application systems function by delivering product from the product tank through a sump valve and pumping and discharging, prior to the filter, the suspension mixture to an agitation proportional valve which is attached to agitation tube(s) or hydraulic stirrer(s). This cycle is performed for a duration of time so that suspension mixture is maintained and dissolved properly. Then upon opening the main delivery shut off valve, the mixture is filtered before proceeding to the nozzles. Inadequate agitation permits large suspension particles that are not completely dissolved within the product tank to be captured by the filter screen, which may cause build-up of the filter and require more frequent removal of the screen to clean and dislodge the suspension particles, which may result in more down time for the applicator.

SUMMARY OF THE INVENTION

In one embodiment, a method comprises influencing fluid flow from a tank to one or more nozzles via a filtering apparatus; and diverting a portion of the fluid flow through plural filters of a different mesh size back to an agitating mechanism through a lower portion of the tank.

These and other aspects of the invention will be apparent from and elucidated with reference to the embodiment(s) described hereinafter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4A-4B are schematic diagrams that illustrate, in side elevation full and partial cut-away views, an embodiment of an example filtering apparatus.

FIGS. 5A-5B are schematic diagrams that illustrate, in side elevation and top perspective, partial cut-away views, an embodiment of an example filtering apparatus.

DESCRIPTION OF EXAMPLE EMBODIMENTS

Figure 1:
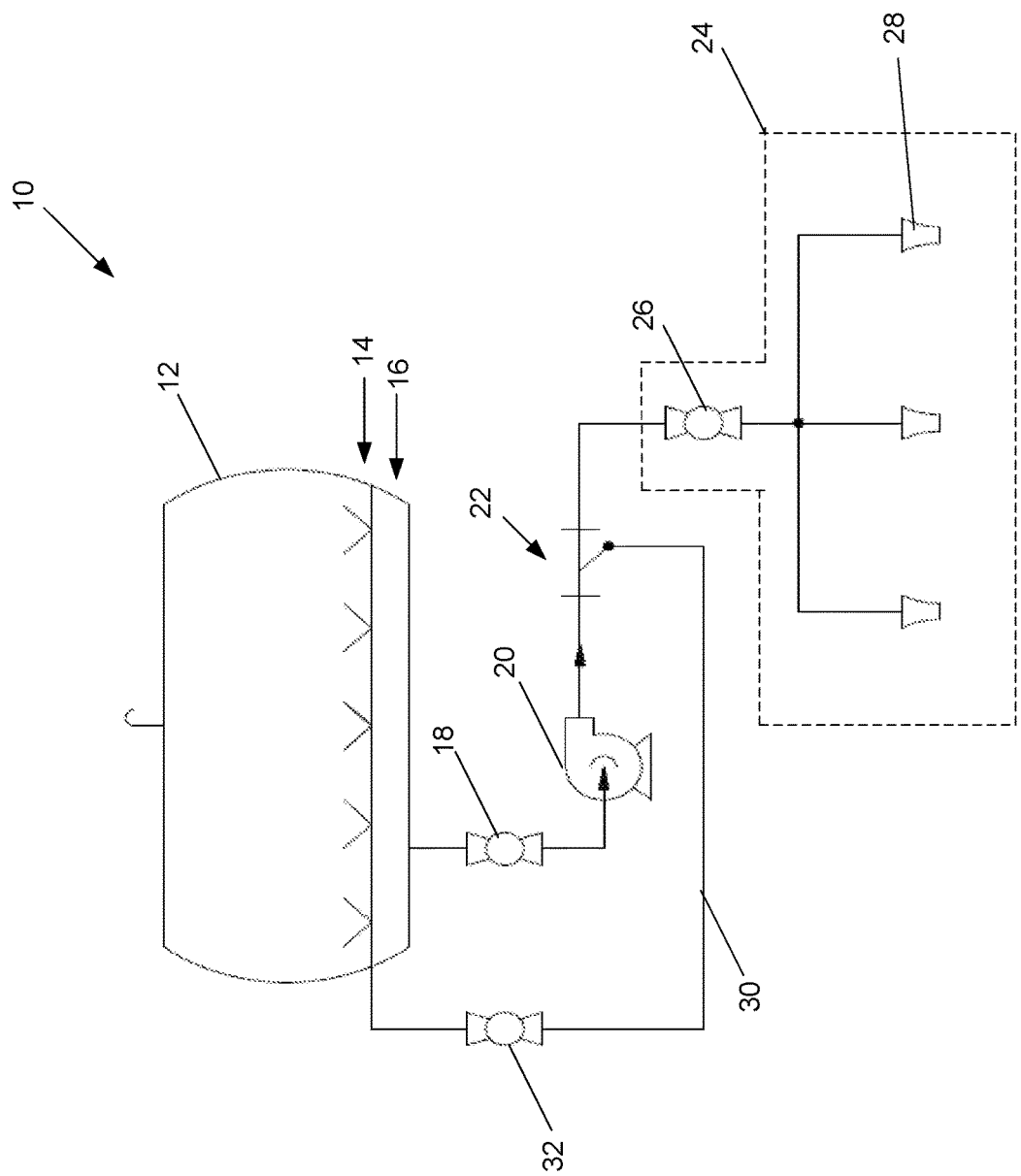
FIG. 1 is a schematic diagram that conceptually illustrates in simplified view select components of a sprayer system in which an embodiment of a filtering system may be used.

Certain embodiments of a sprayer filtering system and associated methods and devices (collectively, sprayer filtering system) are disclosed that port a return line off of a filtering apparatus located between a product tank and one or more nozzles, and directs the returned fluid to an agitation mechanism in the product tank of a sprayer vehicle. In one embodiment, the filtering apparatus comprises multiple filters of a different mesh size to provide filtered fluid to nozzles of a boom while recirculating some fluid particles back to the agitation mechanism and also stopping the passage of larger debris (e.g., leaves, foils, etc.) to prevent clogging strainer drain valves coupled to the filtering apparatus.

Digressing briefly, sprayer systems attempt to recirculate the fluid through the product tank before allowing passage to the nozzles, the intent of such recirculation to use the agitation mechanisms of the tank to keep the particulate matter in a suitable suspension mixture and dissolved properly to avoid clogging of the nozzles. One or more downstream filters are used to filter the fluid before reaching the nozzles, with drain valves connected to one or each filter to enable the operator to discharge trapped debris and remove the debris from the sprayer system. Return product from such sprayer systems is discharged at or near the top of the product tank, where the particulate matter migrates toward the bottom of the tank to, hopefully, be subject to further agitation and eventual discharge from a sump and discharge to the sprayer system. As time goes on, the material builds up on the filters, reducing their effectiveness and restricting flow. This condition is further worsened by the commonly employed technique of constraining flow through the filters to instances when the nozzles are actually spraying the liquid material (otherwise, the liquid stagnates in the filter (s)). Also, there is a risk of clogging the drain valves with debris. In certain circumstances, such as rain outs, product left in the tank may settle at the bottom, bypassing the agitation mechanism upon start-up the next available day, risking the integrity of pump operation when a sump valve enables the flow of the fluid on start-up. All of these conditions may lead to extended or more frequent down time to replace filters and/or replace or repair other components of the system, which also incurs costs and engenders a loss of productivity. To address one or more of these concerns, certain embodiments of a filtering system are disclosed that use a filtering apparatus that filters the fluid as it flows from the product tank while porting some of the fluid back to the agitation mechanism. Also, the filtering apparatus may comprise an additional filter that may prevent larger debris from reaching and potentially clogging the drain valve(s). The filtering and porting is achieved while the sprayer vehicle is in operation (e.g., regardless of whether the nozzles are discharging liquid), which facilitate the cleaning of the filters of the filtering apparatus and prevents or mitigates build-up on the filters.

Having summarized certain features of a filtering system of the present disclosure, reference will now be made in detail to the description of certain embodiments of a filtering system as illustrated in the drawings. While the filtering system will be described in connection with these drawings, there is no intent to limit it to the embodiment or embodiments disclosed herein. For instance, though emphasis is on self-propelled sprayers, some embodiments of a filtering system may be implemented in towed sprayer implements. Also, though emphasis is on sprayer vehicles for the agricultural industry, in some embodiments, sprayer vehicles for other industries (e.g., municipalities, construction, mining, etc.) may similarly benefit, and hence are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications, and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions or relative positions or orientations, such as, for example, "top" or "bottom" or "upper" and "lower" are made as viewed from a side elevation of a sprayer vehicle.

FIG. 1 is a schematic diagram that conceptually illustrates in simplified view select components of a sprayer system 10 in which an embodiment of a filtering system may be used. The sprayer system 10 may reside on a self-propelled, agricultural sprayer vehicle, including a Terragator® or Rogator® from AGCO, though other manufacturers for the same industry or for different industries may also be used. In some embodiments, the sprayer system 10 may reside on a towed implement. The sprayer system 10 comprises a product tank 12 (also, simply referred to herein as a tank). The tank 12 may store liquid (or fluid, both terms used interchangeably) product or material, including pesticides, herbicides, insecticides, fungicides, fertilizer, etc. The fluid in the tank may have particulate matter that may clog components of the sprayer system 10, and hence the need for an agitation mechanism 14 located in the lower portion of the tank 12 (and filters). The agitation mechanism 14 may include a sparge tube, one or more jet nozzles (e.g., venturis), or a stirrer (e.g., propeller-based stirrer), or any combination of these or other devices. In effect, the agitation mechanism 14 agitates the liquid in the lower portion of the tank to maintain a suitable suspension mixture with dissolved particles, and hence any assembly or device to enable this agitation is contemplated to be within the scope of the disclosure. In the lowest portion of the tank 12 is a sump 16, from which the fluid is controllably discharged using a sump valve 18. The sump valve 18 may be an electrically actuated valve, hydraulically actuated valve, or pneumatically actuated valve.

The sprayer system 10 further comprises a pump 20 (e.g., centrifugal pump). The pump 20 receives the fluid from the tank 12 and, through the differential pressure created by the pump 20, as is known, influences the flow of fluid through the sprayer system 10 (e.g., causing the discharge of pressurized fluid).

The sprayer system 10 further comprises a filtering apparatus 22. The filtering apparatus 22 comprises at least one filter that is used to filter the pressurized fluid received from the pump 20. The resulting filtered fluid is provided to a fluid dispensing system 24, which may reside in part on a boom supported or towed (in the case of a towed implement) by the vehicle. The fluid dispensing system 24 dispenses the fluid onto the ground and/or vegetation (e.g., crop, weeds, etc.) depending on the application. The fluid dispensing system 24 comprises one or more valves 26 to, for instance, control an on/off operation of one or more nozzles 28, the latter being the point of fluid discharge. Fluid is recirculated from the fluid dispensing system 24 back to the tank 12 via one or more return lines, the return lines (not shown) returning fluid back toward or at the top of the tank 12.

The filtering apparatus 22 further comprises a port for direct or indirect (e.g., via a tee fitting) connection to a return line 30. As explained further below, unfiltered fluid (or semi-filtered fluid, depending on the presence of a second filter or screen) not returned to the filtering apparatus main outlet (for directing the filtered fluid to the fluid dispensing system 24) is (continuously, e.g., as long as the sprayer vehicle is operational within the field regardless of nozzle activation) directed back to the agitation mechanism 14 of the tank 12 via the return line 30. The return line 30 is plumbed to a proportional valve 32, which controls the injection of the returned fluid (from the filtering apparatus 22) to the agitation mechanism 14 via connection through a lower inlet of the tank 12. The proportional valve 32 may be an electric, hydraulic, or pneumatic valve. In effect, the fluid from the filtering apparatus 22 that has been returned via the return line 30 is directly discharged into or proximal to the agitation mechanism 14 of the tank 12 for re-agitation (e.g., of unfiltered fluid containing particulate matter that has not been sufficiently dissolved in the suspension to pass through the main outlet of the filtering apparatus 22 and to the nozzles 28). In other words, return residual from the filtering apparatus 22 is fed directly back into the agitation mechanism 14 (e.g., tube, hydraulic stirrer(s), etc.) within the product tank 12 to induce re-agitating the suspension mixture that was inadequately dissolved to pass through the filter screen and to the nozzles 28.

In some embodiment, the filtering apparatus 22 may include another filter or screen (e.g., and hence, plural screens), which may be used as a secondary screen to capture foreign debris to prevent clogging or plugging of the agitation mechanism 14 and/or clogging of a connected drain valve (not shown in FIG. 1). By this arrangement of components and corresponding method, if the optional secondary screen of the filtering apparatus 22 is used and has a larger mesh than the primary filter or screen, any particles larger than the primary screen will be flushed to the product tank 12 instead of clogging the primary screen and henceforth allow the particles to be re-agitated within the product tank 12. This is an automated process when the agitation function is utilized. In effect, the use of agitation mechanism 14 lengthens the cleaning interval of the primary screen and eliminates the need for a secondary valve that would have to be controlled separately and independent from the agitation system when cleaning the primary screen.

In some embodiments, the agitation proportional valve 32 may be cycled during a product recovery process so product in the filtering apparatus 22 may be reclaimed back to the product tank 10.

It is noted that the schematic depicting the sprayer system 10 of FIG. 1 is an example illustration that conceptually shows the primary elements of the sprayer system 10, and that one skilled in the art should, in the context of the present disclosure, understand that other fittings and/or components are used to facilitate operations of the sprayer system 10. In some embodiments, as indicated above, when the sprayer vehicle is moving through the field (or from one field to another), and the agitation mechanism 14 is engaged, the fluid flow through the sprayer system 10, and especially through the filtering apparatus 22, continues, which prevents or mitigates the buildup of sediment on the screens/filters.

One embodiment of a filtering system comprises the filtering apparatus 22. In some embodiments, a filtering system comprises the filtering apparatus and the agitation mechanism 14. In some embodiments, the filtering system comprises additional components of the sprayer system 10.

Figure 2A:
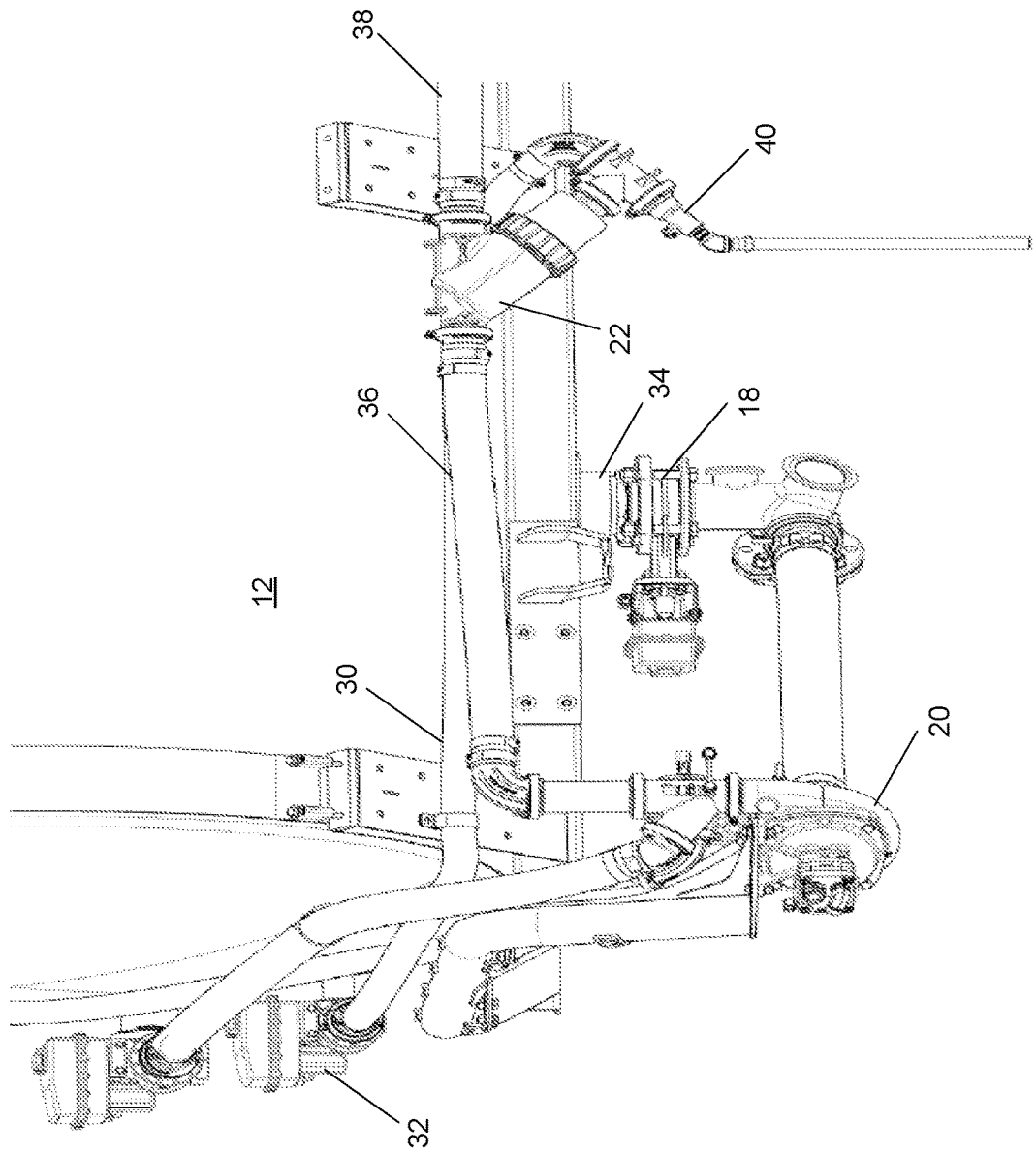
FIGS. 2A-2B are schematic diagrams that illustrate select components of an embodiment of filtering system with and without fluid flow symbols.
Figure 2B:
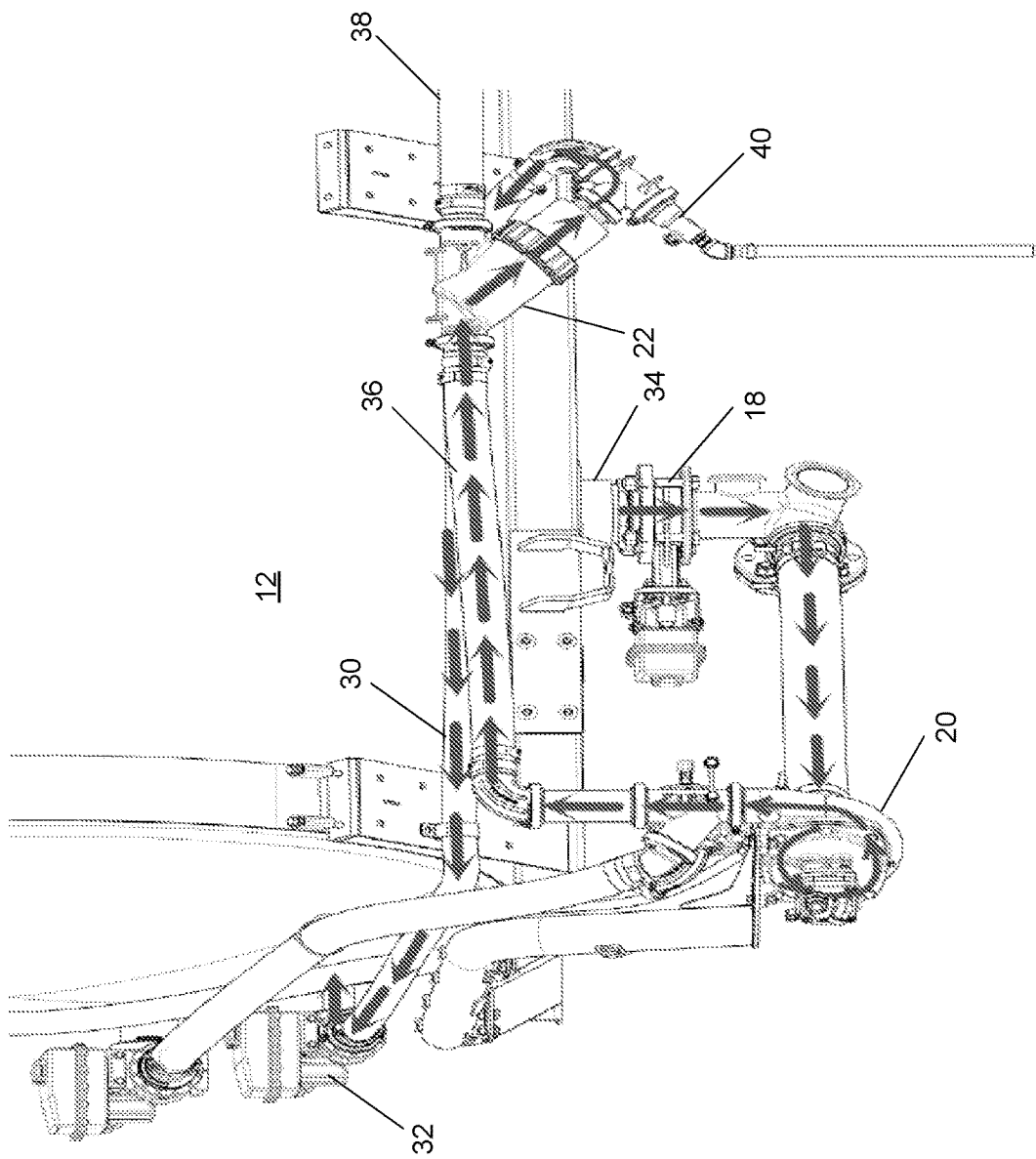

FIGS. 2A-2B are schematic diagrams that illustrate select components of an embodiment of filtering system with and without fluid flow symbols. Shown is a lower portion of the tank 12, the sump valve 18 coupled to a sump outlet 34 of the tank 12. Also shown is the pump 20, which draws fluid from the sump of the tank 12 via the sump outlet 34 and sump valve 18 and causes the flow of the fluid through a pump discharge line 36 to the fluid dispensing system 24 (FIG. 1) via the filtering apparatus 22. Filtered fluid passing through a first screen of the filtering apparatus 22 is directed via the main feed line 38 to the fluid dispensing system 24. Fluid that does not pass through the first screen of the filtering apparatus 22 may flow along the first screen (providing a mechanism to clean the inner surface of the first screen) and pass through the first screen along the length of the first screen and be ported (via an internal port of the filtering apparatus 22) back through the main outlet of the filtering apparatus 22 and through the main feed line 38 to the fluid dispensing system 24. Fluid that does not pass through the first screen somewhere along the length of the first screen of the filtering apparatus 22 is filtered, in one embodiment, through a round or disc-shaped second screen of a larger mesh than the other (main or first) screen, where debris may be trapped at the second screen within the filtering apparatus 22. Shown coupled to the filtering apparatus 22 is a drain valve 40. The flow of semi-filtered fluid that has passed through the second screen of the filtering apparatus 22 is ported back via the return line 30 to the proportional valve 32. The proportional valve 32 controls the flow of the returned and semi-filtered fluid to the agitation mechanism 14 of the tank 12 through an inlet in the lower portion of the tank 12 to provide for re-agitation of the fluid.

Figure 3:
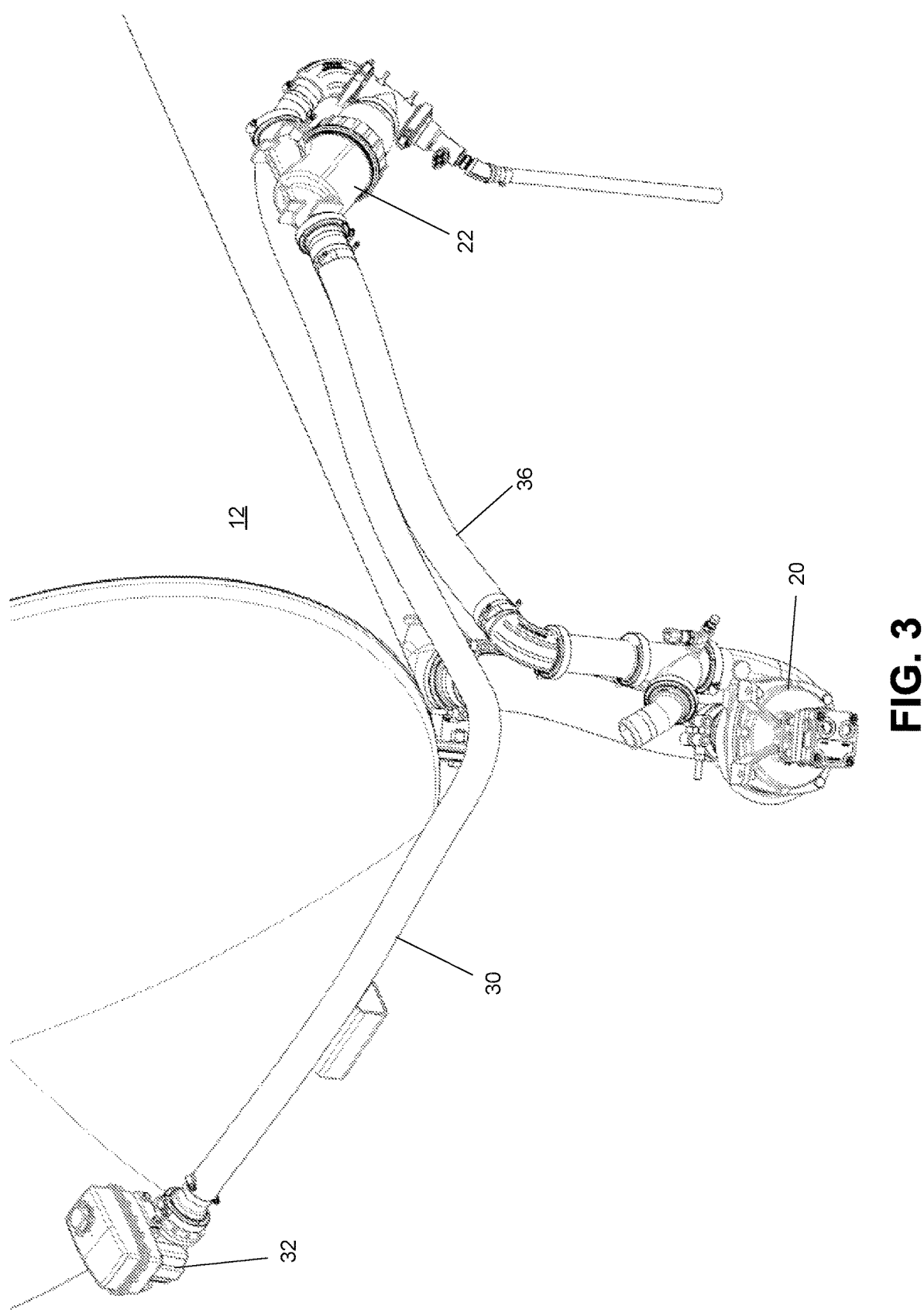
FIG. 3 is a schematic diagram that illustrates select components, in perspective view, of an embodiment of filtering system.

FIG. 3 provides a closer view of select components from FIGS. 2A-2B, namely, the tank 12, the pump 20, the filtering apparatus 22, and the proportional valve 32. The pump 20 receives the fluid from the tank 12 (the discharge controlled by the sump valve 18 (e.g., FIG. 2A)), and discharges the pressurized fluid via the pump discharge line 36 and through the filtering apparatus 22 and through the main feedline 38 to feed the fluid dispensing system 24. The fluid flowing through the pump discharge line 36 is filtered by the filtering apparatus 22, with a portion (e.g., unfiltered or semi-filtered portion when a secondary filter is used) of the fluid directed back to the proportional valve 32 via return line 30 for injection in the lower portion of the tank 12 into or proximal to the agitation mechanism 14 (FIG. 1).

Figure 4B:
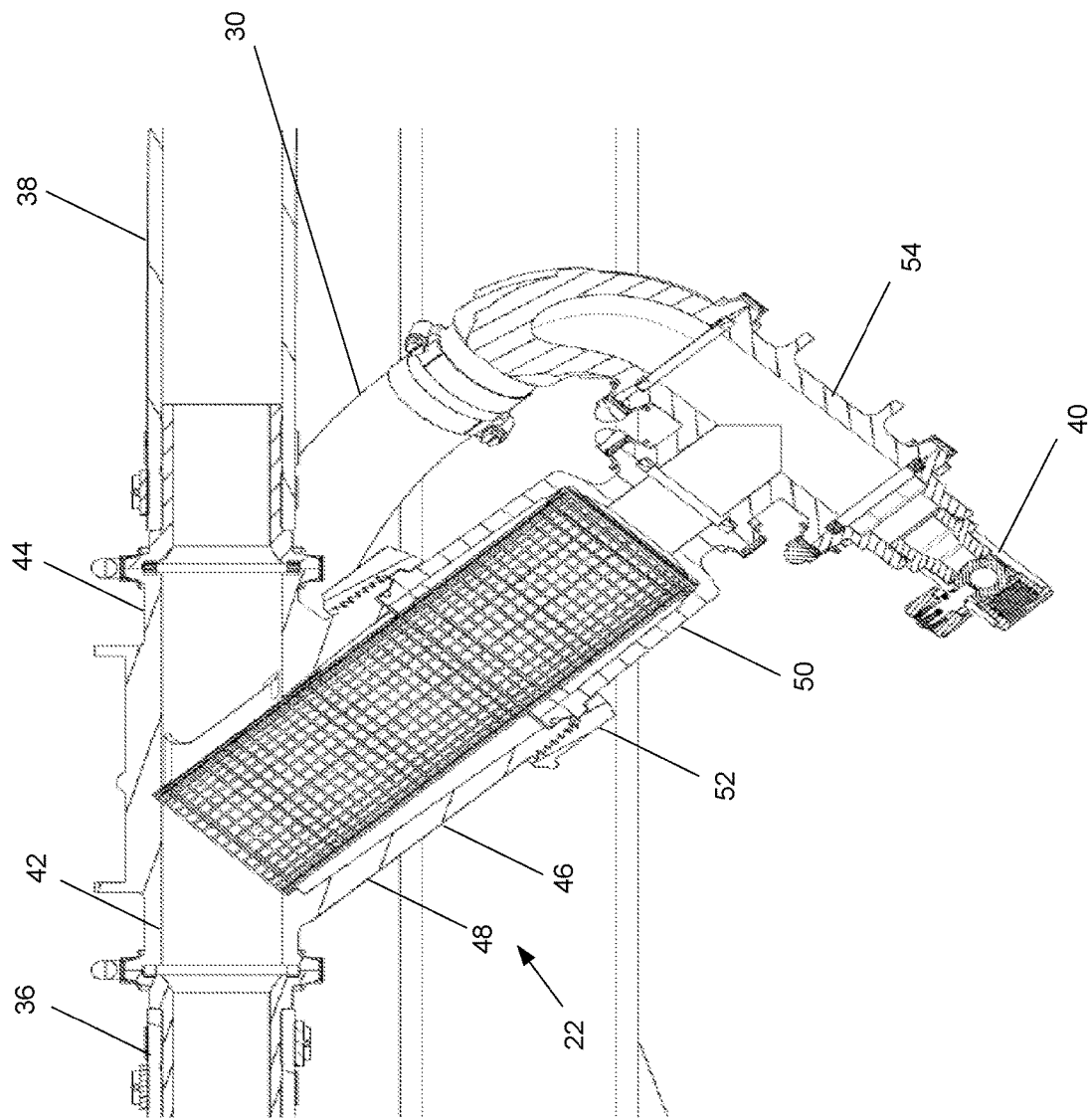

FIGS. 4A-4B are schematic diagrams that illustrate full and partial cut-away views, respectively, of the filtering apparatus 22. The filtering apparatus 22 comprises a main inlet 42, a main outlet 44, and a filtering branch 46. The main inlet 42 and main outlet 44, in one embodiment, are co-linear with each other, and the filtering branch 46 is angled (e.g., downward) relative to the main inlet 42 and main outlet 44. The main inlet 42 is coupled to (and fluidly connected) to the pump discharge line 36. The main outlet 44 is coupled to (and fluidly connected) to the main feed line 38. The filtering apparatus 22 comprises an upper portion 48 and a lower portion 50 (also referred to herein as a bowl) removably coupled to each other via a nut 52. For instance, the nut 52 may be loosened to enable the bowl 50 to be removed to access and/or remove screens (filters) located in the filtering apparatus 22. In some embodiments, the filtering apparatus 22 may have other access points for the interior of the filtering apparatus 22. In some embodiments, the coupling between the upper portion 48 and the bowl 50 may be achieved via other detachable mechanisms. The bowl 50 is coupled to a tee fitting 54, which is coupled, on one end, to the drain valve 40, and on the other end, the return line 30.

Referring in particular to FIG. 4B, shown is a first or main screen or filter 56 (filter and screen used interchangeably herein), which comprises a length of substantially the length of the filtering branch 46, including extending into the flow path of collectively the pump discharge line 36, the main inlet 42, the main outlet 44, and main feed line 38. That is, the main filter 56 filters the fluid flowing from the pump discharge line 36 and the main inlet 42 and to the main outlet 44 and main feed line 38. In one embodiment, the main filter 56 comprises a cylindrical geometry or shape (e.g., a cylinder) that is open-ended (on each side), and has a suitable mesh size (mesh configuration) for the fluid suspension that flows through it. In one embodiment, the mesh size of the main filter 56 is 50 mesh. In some embodiments, the mesh size of the main filter 56 is 80 mesh. Other mesh sizes may be used depending on the application. Fluid that does not pass through that portion of the main filter 56 extending into the aforementioned main flow path flows through the cylindrical interior of the main filter 56. A portion of the fluid passing through the interior of the main filter 56 passes through the filter mesh (filter wall) and is ported internally back through the main outlet 44. The fluid that passes through the interior of the main filter 56 provides a cleaning function for the interior surfaces of the main filter 56. The portion of the fluid that does not pass through the mesh (wall) of the main filter 56 is passed through the tee fitting 54 and back to the agitation mechanism 14 via the return line 30 as described above. Larger debris may collect at the drain valve 40 and be removed via opening of the drain valve 40 (and/or be returned to the tank 12). In some embodiments, an additional filter (second filter) may be positioned adjacent to a lower portion of the main filter 56, as explained further below, which prevents the larger debris from either clogging the drain valve 40 or being returned to the tank 12.

Figure 5B:
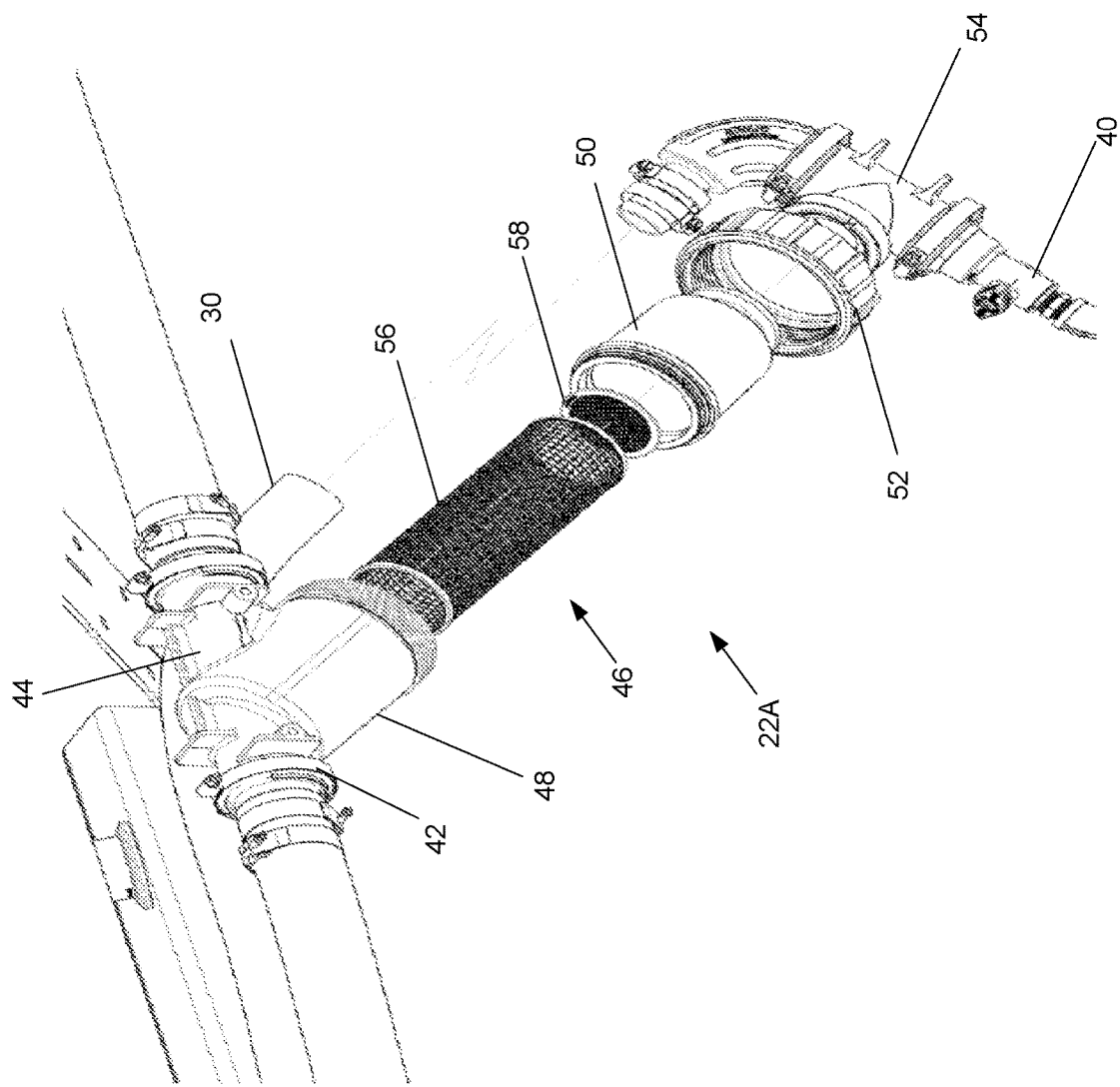

FIGS. 5A-5B illustrate different partial cut-away views of an embodiment of a filtering apparatus 22A that includes main and secondary filters. The filtering apparatus 22A is similar to the filtering apparatus 22 described above except for the addition of a secondary filter or screen. The filtering apparatus 22A comprises components described above for filtering apparatus 22, namely, the main inlet 42, main outlet 44, filtering branch 46, upper portion 48, bowl 50, nut 52, and main filter 56. The bowl 50 is coupled to the tee fitting 54, which is coupled to the drain valve 40 and the return line 30 (partially omitted from view in FIGS. 5A-5B). Additionally shown is a secondary (or second) screen or filter 58. The second filter 58 is adjacent to, and separable from, the main filter 56. The second filter 58 comprises a different mesh size than the main filter 56, and in some embodiments, comprises a coarser (larger holes) mesh than the main filter mesh. In one embodiment, the second filter 58 comprises a mesh size of eight (8), though in some embodiments, other mesh sizes may be used depending on the application. As depicted in FIGS. 5A-5B, the second filter 58 comprises a round or disc shape or geometry. The second filter 58 is adjacent, and concentrically abutted, to the main filter 56, which prevents debris of a certain size from flowing through and clogging up the drain valve 40 and/or returning to the tank 12. The second filter 58 is shown downstream (e.g., lower than) the main filter 56, which facilitates easy access and removal for an operator (e.g., if the operator wishes to change the second filter 58 to a different mesh size, replace, clean, etc.). For instance, an operator or other personnel may loosen the nut 52, which allows the bowl 50 to drop and the second filter 58 along with it. In other words, the second filter 58 is not attached to the first filter 56, though in some embodiments, the second filter 58 may be attached to the first filter 56. When assembled, the filters 56, 58 are constrained in place by the upper portion 48, bowl 50, and nut 52. The main filter 56 is contained within both upper and lower portions 48, 50, whereas the second filter 58 is contained within the bowl 50. In some embodiments, the second filter 58 may be located upstream of the main filter 56 (e.g., adjacent to and separate from the main filter 56). In such instances, accommodations should be made to enable access to and removal of debris.

The filters 56, 58 may be comprised of metal, non-metal (e.g., plastic), or a combination thereof, and are of a suitable construction to maintain operational integrity in the pressurized fluid (e.g., chemical) environment.

Figure 6A:
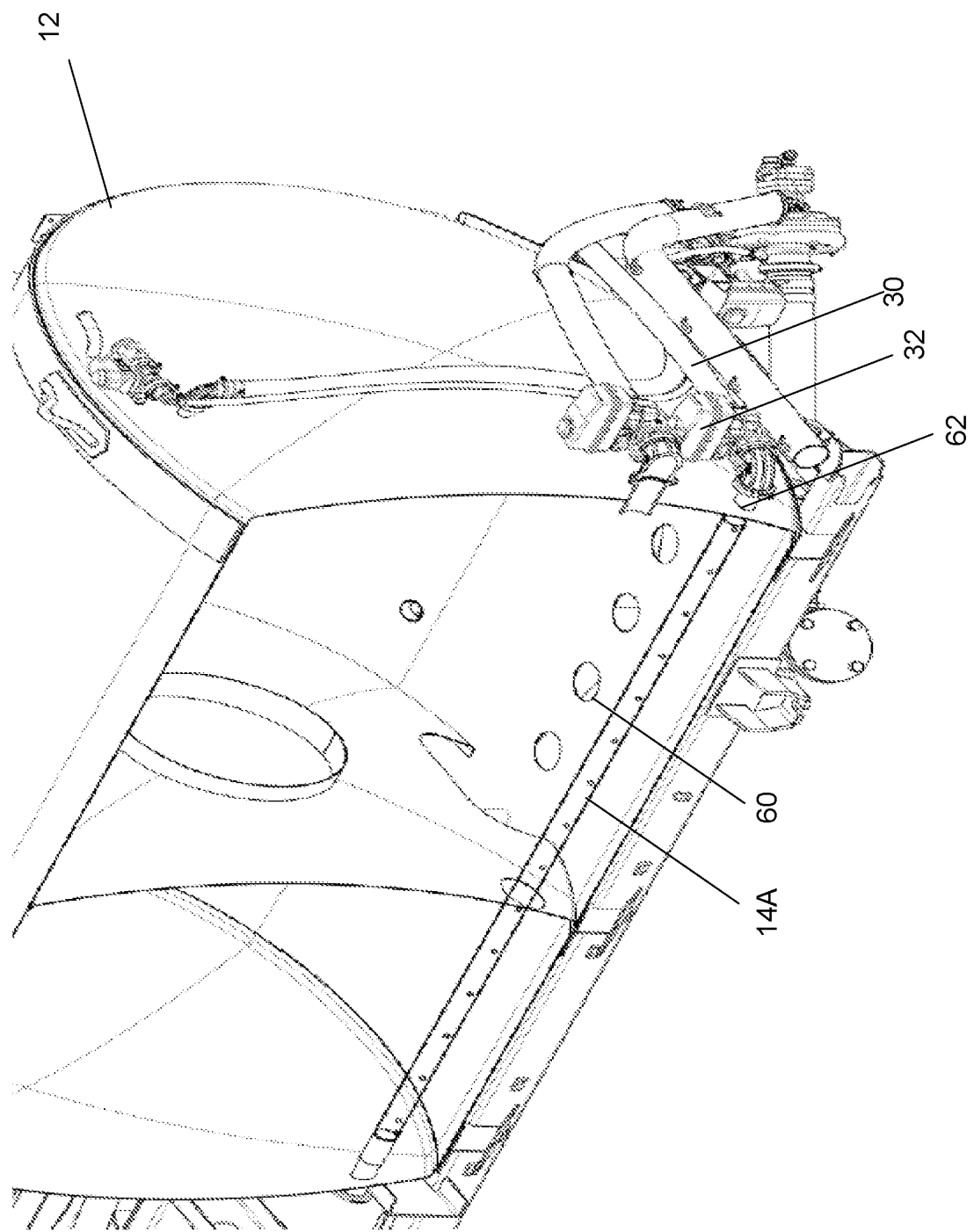
FIGS. 6A-6B are schematic diagrams that illustrate example connections of a return line from a filtering apparatus to an agitation mechanism with and without fluid flow symbols.
Figure 6B:
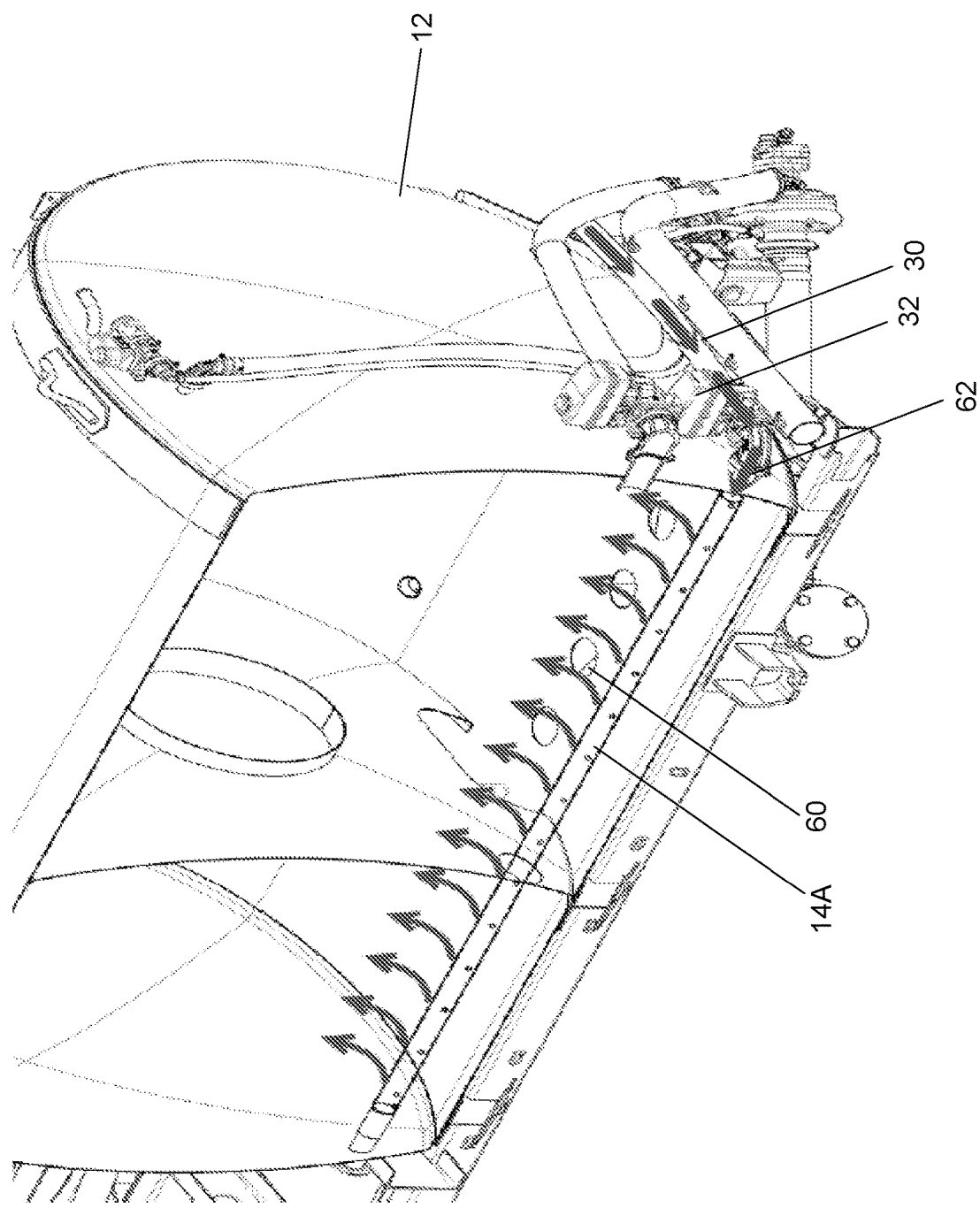

FIGS. 6A-6B are schematic diagrams that illustrate example connections of the return line 30 from the filtering apparatus 22 (or 22A) (obscured from view in FIGS. 6A-6B, but shown in, for instance, FIGS. 5A, 4A, etc.) to one type of agitation mechanism 14A. The figures are shown without fluid flow symbols (FIG. 6A) and with fluid flow symbols (FIG. 6B). The agitation mechanism 14A is depicted as a sparge tube (also referenced herein as sparge tube 14A), though as indicated above, the agitation mechanism 14 may be embodied according to other types of agitation mechanisms. As is known, the sparge tube 14A comprises a tube (in the depicted embodiment, extending the length of the tank 12, though not necessarily in some embodiments) with spaced apart openings along its length to enable pressurized fluid (injected from the proportional valve 32 and directed downward in the tank 12) to agitate the lower portion of the tank 12 before the agitated fluid migrates to the sump through sump inlets 60. The proximity of the discharge of the semi-filtered return fluid arising from the filtering apparatus 22 (or 22A) to the agitated area of the tank 21 via a lower inlet connection 62 of the tank 12 results in a higher velocity mixing of the fluid in the lower portion of the tank 112 (versus simply returning the fluid from the fluid dispensing system 24, FIG. 1, into the top of the tank 12 and hoping for an appropriate agitation of the return fluid).

Note that control of the proportional valve 32, sump valve 18, pump 20, among other actuable components of the sprayer system 10 (FIG. 1) may be performed using one or more controllers based on signals or instructions prompted by operator input at a user interface, including a keyboard, mouse, microphone, touch-type display device, head-set, and/or other devices. The operator input may be received locally, such as from the cab of the sprayer vehicle or near the tank 12, or remotely via communication to a gateway (e.g., cellular and/or wireless modem). In some embodiments, actuation and/or operation of the sprayer system 10 may be achieved automatically, including based on detection of the vehicle within a given geofence using field maps and navigational systems (e.g., global navigational satellite systems (GNSS) or using triangulation (cellular) or other mechanisms (including the use of sensors).

Figure 7:
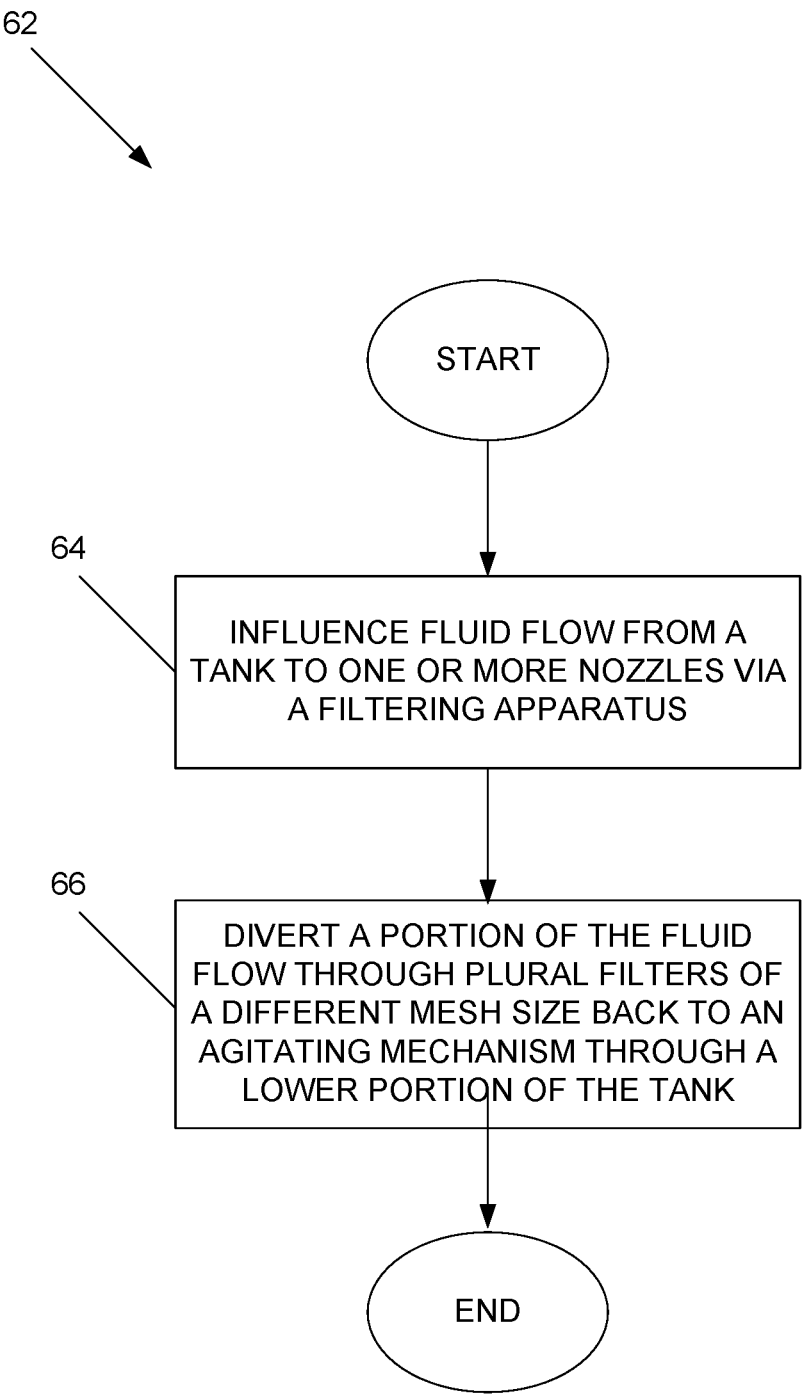
FIG. 7 is a flow diagram that illustrates an embodiment of an example filtering method.

In view of the above description, it should be appreciated by one having ordinary skill in the art, in the context of the present disclosure, that one embodiment of a filtering method, depicted as method 62 in FIG. 7 and implemented by the sprayer system 10 (FIG. 1), comprises influencing fluid flow from a tank to one or more nozzles via a filtering apparatus (64); and diverting a portion of the fluid flow through plural filters of a different mesh size back to an agitating mechanism through a lower portion of the tank (66).

Any process descriptions or blocks in flow diagrams should be understood as representing logic and/or steps in a process, and alternate implementations are included within the scope of the embodiments in which functions may be executed out of order from that shown or discussed, including substantially concurrently, or with additional steps (or fewer steps), depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A sprayer vehicle, comprising:
a chassis;
a tank supported by the chassis and comprising an agitator and a sump, the agitator in a lower portion of the tank proximal to the sump, the agitator fluidly coupled to a tank inlet, the tank defining a tank outlet at the sump;
a first valve coupled to and fluidly connected to the tank outlet;
a second valve coupled to and fluidly connected to the tank inlet;
a pump coupled to and fluidly connected to the first valve; and
a filtering apparatus defining a main inlet, main outlet, and a second outlet, wherein the main inlet is coupled to and fluidly connected to a pump discharge line coupled to and fluidly connected to the pump, wherein the filtering apparatus comprises a first filter arranged to filter fluid passing from the main inlet through the main outlet while directing solids toward the second outlet, and wherein the agitator is coupled to and fluidly connected to the second outlet of the filtering apparatus via the second valve and the tank inlet; and
a least one nozzle coupled to and fluidly connected to the first filter.

2. The sprayer vehicle of claim 1, further comprising a second filter adjacent the first filter in a fluid connection between the main inlet and the second outlet.

3. The sprayer vehicle of claim 2, wherein a mesh size of the first filter is smaller than a mesh size of the second filter.

4. The sprayer vehicle of claim 2, wherein a portion of fluid flowing through the second outlet passes through the second filter.

5. The sprayer vehicle of claim 1, further comprising a port in fluid connection from the second outlet to the agitator, such that the pressurized fluid can flow through the first filter to the agitator regardless of whether pressurized fluid flows through the main outlet.

6. The sprayer vehicle of claim 1, wherein the agitator comprises a sparge tube.

7. The sprayer vehicle of claim 1, wherein the agitator comprises at least one venturi device.

8. The sprayer vehicle of claim 1, wherein the agitator comprises a propeller-based stirrer.

* * * * *